(12) United States Patent
Yasuda et al.

(10) Patent No.: US 7,737,076 B2
(45) Date of Patent: Jun. 15, 2010

(54) CATALYST AND PRODUCING METHOD THEREOF

(75) Inventors: Hirofumi Yasuda, Yokosuka (JP); Katsuo Suga, Yokohama (JP); Masanori Nakamura, Yokosuka (JP); Kazuyuki Shiratori, Yokohama (JP); Hironori Wakamatsu, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 805 days.

(21) Appl. No.: 10/583,970

(22) PCT Filed: Dec. 2, 2004

(86) PCT No.: PCT/JP2004/018338

§ 371 (c)(1),
(2), (4) Date: Jun. 22, 2006

(87) PCT Pub. No.: WO2005/063384

PCT Pub. Date: Jul. 14, 2005

(65) Prior Publication Data

US 2007/0155625 A1    Jul. 5, 2007

(30) Foreign Application Priority Data

Dec. 25, 2003    (JP)    ............................. 2003-431000

(51) Int. Cl.
*B01J 23/00* (2006.01)
*B01J 23/10* (2006.01)
*B01J 23/40* (2006.01)
*B01J 23/48* (2006.01)

(52) U.S. Cl. .................. 502/325; 502/302; 502/303; 502/304; 502/326; 502/327

(58) Field of Classification Search ......... 502/102–104, 502/150, 300, 302–304, 325–355
See application file for complete search history.

(56) References Cited

U.S. PATENT DOCUMENTS 4,425,261 A * 1/1984 Stenius et al. ............... 502/339

(Continued)

FOREIGN PATENT DOCUMENTS

EP    0 466 984    1/1992

(Continued)

OTHER PUBLICATIONS

"Training Papers Spray Drying", BUCHI Labortechnik AG, Copyright 1997-2002, English Version, Order Code: 97758; Obtained at http://www.buchi.com/spray-drying.69.0html?&no_cache=1&file=308&uid=2283.*

(Continued)

*Primary Examiner*—Jerry Lorengo
*Assistant Examiner*—Jared Wood
(74) *Attorney, Agent, or Firm*—Foley & Lardner LLP (57) ABSTRACT

A catalyst producing method comprises preparing reverse micellar solution including an aqueous solution containing at least a noble metal element as a catalytic active component, and carrying the catalytic active component by a substrate to establish them into a catalyst precursor; and spraying the emulsion solution containing the catalyst precursor in an inert gas atmosphere to obtain a dried catalyst precursor, and firing the obtained dried catalyst precursor in an air atmosphere. A catalyst is obtained by the catalyst producing method.

8 Claims, 2 Drawing Sheets

U.S. PATENT DOCUMENTS

| | | | | |
|---|---|---|---|---|
| 4,714,693 | A | * 12/1987 | Targos | 502/261 |
| 6,413,489 | B1 | * 7/2002 | Ying et al. | 423/600 |
| 7,022,642 | B2 | * 4/2006 | Yamamoto | 502/185 |
| 2002/0045543 | A1 | * 4/2002 | Takatori et al. | 502/302 |

FOREIGN PATENT DOCUMENTS

| | | | |
|---|---|---|---|
| EP | 466984 A1 | * | 1/1992 |
| EP | 940176 A2 | * | 9/1999 |
| JP | 09-262470 | | 10/1997 |
| JP | 2000-42411 | | 2/2000 |
| JP | 2001-103606 | | 4/2001 |
| JP | 2002-024847 | | 1/2002 |
| JP | 2002-066335 | | 3/2002 |
| JP | 2003-288905 | | 10/2003 |
| JP | 2003-290667 | | 10/2003 |
| WO | WO 85/03241 | | 8/1985 |

OTHER PUBLICATIONS

M.J. Escudero et al., "Development and performance characterization of new electrocatalysts for PEMFC", Journal of Power Sources 106 (2002) (pp. 206-214).

* cited by examiner

FIG.2

CATALYST AND PRODUCING METHOD THEREOF

TECHNICAL FIELD

The present invention relates to a catalyst usable as an exhaust-gas purifying catalyst to be mounted on a vehicle, and to a producing method thereof.

BACKGROUND ART

Regulations of exhaust gas of vehicles have been strengthened with recently increased environmental consciousness, so that various investigations have been conducted to improve engine systems and to simultaneously improve performances of exhaust-gas purifying catalysts for purifying exhaust gas. Exhaust-gas purifying catalysts include substrates (such as alumina ($Al_2O_3$)) having surfaces carrying thereon noble metal particles (such as platinum (Pt) or palladium (Pd)), and oxidize harmful components (such as unburnt hydrocarbons (HC) and carbon monoxide (CO)) contained in exhaust gas by noble metal particles, thereby converting harmful components into harmless components (water and gases). Since noble metal elements as catalytic active components are extremely expensive elements having a fear of resource exhaustion, it is getting difficult to use a large amount of noble metal. There has been thus conducted such an endeavor to bring noble metal into fine particles thereby increasing surface areas and thus increasing contacting areas between exhaust gas and noble metal, to thereby decrease a usage amount of noble metal.

Examples of techniques for bringing noble metal into fine particles include a reversed micelle (microemulsion) method. The reversed micelle method is to firstly mix: a surfactant; and an aqueous solution containing a catalytic active component (such as noble metal element); into an organic solvent. Subsequently, there is prepared reverse micellar solution including the organic solvent each containing the aqueous solution including the noble metal, followed by precipitation of the noble metal and reduction or insolubilization of the precipitated noble metal, thereby depositing the noble metal brought into fine particles within reverse micelles.

Japanese Patent Application Laid-Open Publication No. 9-262470 has disclosed a producing method of a catalyst utilizing a reversed micelle method. In this method, there is firstly prepared reverse micellar solution including catalytic active components (noble metal element, alkaline metal element, rare earth element) (emulsion solution preparing step), the emulsion solution is then sprayed and fired in air to provide a catalytic powder (spraying and firing step), and catalytic active components are carried on to a substrate (carrying step), followed by firing to obtain a catalyst. However, in this method, catalytic active components are carried on the substrate after spraying the emulsion solution, so that noble metal particles are carried only on the outermost surface of the substrate. This results in a possibility that noble metal particles are sintered due to usage of the catalyst over a long period of time to thereby deteriorate the activity of the catalyst.

Further, Japanese Patent Application Laid-Open Publication No. 2000-42411 has disclosed a method for producing a catalyst by containing an element having an oxygen occluding function into reverse micelles in an emulsion solution preparing step. In this producing method, catalytic active components are carried on a substrate within each reverse micelle contained in the emulsion solution, then reverse micelles are broken, and the obtained precipitate is subjected to steps of filtering, drying, grinding, and firing to thereby establish the catalyst. The catalyst produced by this producing method is capable of not only allowing the substrate to carry thereon the element having the oxygen occluding function but also allowing the outermost surface and surfaces of holes formed in the substrate to carry thereon catalytic active components, thereby allowing an enhanced activity of the catalyst. However, in this producing method, the catalyst is produced by spraying and firing the reverse micellar solution, thereby causing factors of complicated producing steps, a prolonged producing time and a considerably increased producing cost.

As such, Japanese Patent Application Laid-Open Publication Nos. 2001-103606, 2002-24847, and 2002-66335 have disclosed producing methods of catalysts, respectively, each utilizing a reversed micelle method to prepare reverse micellar solution followed by spraying and firing. In each of the catalyst producing methods, reverse micellar solution is prepared, catalytic active components are carried on a substrate, and the emulsion solution is sprayed and fired. Thus, the producing step can be simplified and the producing time is shortened, thereby allowing a decreased producing cost.

DISCLOSURE OF THE INVENTION

However, in the above-mentioned catalyst producing methods, firing is conducted in two stages in a manner that catalytic active components are carried on substrates, followed by spraying and firing, as well as further firing thereafter. Thus, catalysts obtained by such producing methods include noble metal particles having variances in particle diameters, thereby causing a possibility of deteriorated activities of catalysts, respectively.

The present invention has been carried out to solve the above problems.

According to an aspect of the present invention, a catalyst producing method comprises preparing reverse micellar solution including an aqueous solution containing at least a noble metal element as a catalytic active component, and carrying the catalytic active component by a substrate to establish them into a catalyst precursor; and spraying the emulsion solution containing the catalyst precursor in an inert gas atmosphere to obtain a dried catalyst precursor, and firing the obtained dried catalyst precursor in an air atmosphere.

According to another aspect of the present invention, a catalyst is obtained by preparing reverse micellar solution including an aqueous solution containing at least a noble metal element as a catalytic active component, and carrying the catalytic active component by a substrate to establish them into a catalyst precursor; and spraying the emulsion solution containing the catalyst precursor in an inert gas atmosphere to obtain a dried catalyst precursor, and firing the obtained dried catalyst precursor in an air atmosphere.

BEST MODE FOR CARRYING OUT THE INVENTION

There will be explained catalysts and producing method thereof according to embodiments as best modes for carrying out the present invention.

Figure 1:
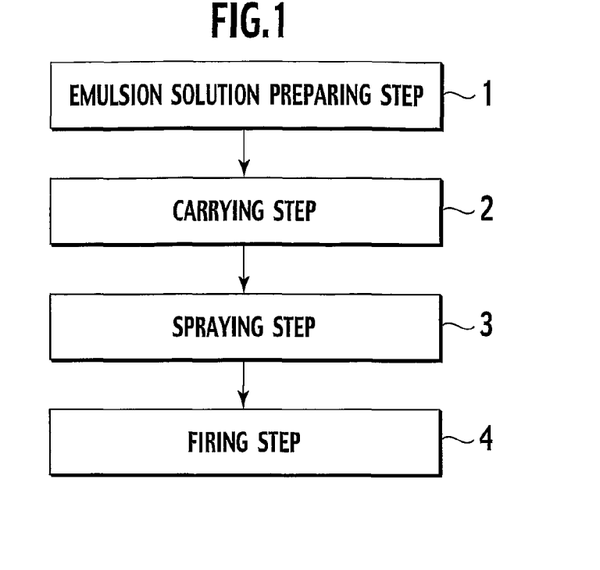
FIG. 1 is a schematic process chart of a catalyst producing method according to an embodiment of the present invention.

There will be firstly explained a catalyst producing method with reference to FIG. 1. As shown in FIG. 1, there is prepared reverse micellar solution including an organic solvent each containing a catalytic active component (emulsion solution preparing step 1), and the catalytic active component is carried on a substrate to establish a catalyst precursor (carrying step 2). Thereafter, the catalyst precursor is sprayed in an inert gas atmosphere to thereby obtain a dried precursor (spraying step 3), and the obtained dried precursor is fired (firing step 4), thereby obtaining a catalyst. The steps of the catalyst producing method shown in FIG. 1 will be concretely described with reference to FIG. 2.

Figure 2:
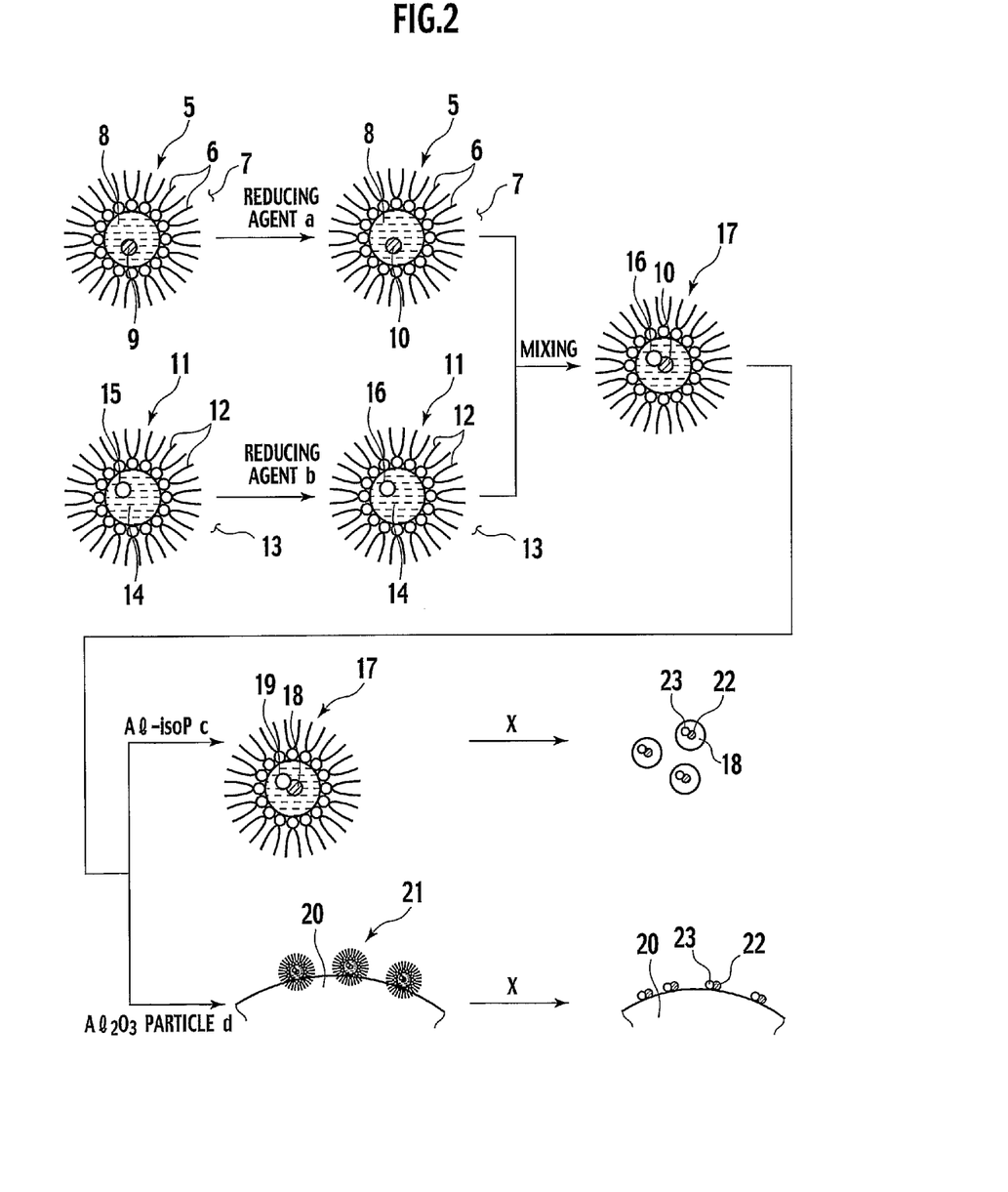
FIG. 2 is an explanatory concrete process chart of the catalyst producing method of FIG. 1.

In the emulsion solution preparing step 1, mixed into an organic solvent are a surfactant and a noble metal salt aqueous solution (such as dinitro-diammine Pt(II) nitric acid-acidic aqueous solution). There is then obtained reverse micellar solution including the organic solvent having diameters of about several tens of nm respectively. As shown in FIG. 2, each reverse micelle 5 is formed into a spherical shape by virtue of the surfactant 6, and an oil phase 7 and a water phase 8 are formed outside and inside the reverse micelle 5, respectively. The water phase 8 inside the reverse micelle 5 contains a solution containing a noble metal precursor 9 made of the noble metal salt as a catalytic active component. Next, there is mixed a reducing agent "a" into the reverse micellar solution to insolubilize the noble metal precursor 9 within the reverse micelle 5 by precipitation or reduction, thereby obtaining a noble metal particle 10 as a catalytic active component brought into a fine particle state.

Similarly, mixed into an organic solvent are a surfactant and a transition metal salt aqueous solution (such as cobalt nitrate aqueous solution). There is then obtained reverse micellar solution including the organic solvent containing reverse micelles formed therein having diameters of about several tens of nm, respectively. As shown in FIG. 2, each reverse micelle 11 is formed into a spherical shape by virtue of the surfactant 12, and an oil phase 13 and a water phase 14 are formed outside and inside the reverse micelle 11, respectively. The water phase 14 inside the reverse micelle 11 contains a solution containing a transition metal precursor 15 made of the transition metal salt as a catalytic active component. Next, there is mixed a reducing agent "b" into the reverse micellar solution to insolubilize the transition metal precursor 15 within the reverse micelle 11 by precipitation or reduction, thereby obtaining a transition metal particle 16 as a catalytic active component brought into a fine particle state. Although the example where the transition metal salt aqueous solution is mixed into the organic solvent is shown here, it is possible to additionally mix a rare earth element salt aqueous solution (such as cerium nitrate aqueous solution) as required.

It is desirable to achieve 20 or less in molar ratio RW (RW=[water]/[surfactant]; hereinafter called "RW") which is a molar ratio of water encapsulated in the reverse micelle 5, 11 relative to the surfactant 6, 12. RW's defined to be 20 or less enable to bring noble metal particles 10 and transition metal particles 16 into fine particles having diameters of 5 nm or less to avoid deterioration of catalytic activity. Contrary, RW's exceeding 20 lead to excessive amounts of water to be contained in reverse micelles 5, 11 to swell the reverse micelles 5, 11 which are unstable, thereby resultantly preventing catalytic active components from being brought into fine particles.

The reverse micellar solution (containing reverse micelles 5) and the reverse micellar solution (containing reverse micelles 11) are mixed into each other, thereby obtaining reverse micellar solution each containing therein a noble metal particle 10 and a transition metal particle 16 as shown in FIG. 2.

The carrying step 2 is a step for causing a substrate to carry a noble metal particle 10 and a transition metal particle 16 thereon, thereby forming a catalyst precursor. Noble metal particles 10 and transition metal particles 16 having particle diameters of 5 nm or less, respectively, obtained by the emulsion solution preparing step 1 can be relatively uniformly carried on a surface of substrate. It is desirable to adopt following two kinds of methods, as a method for causing a surface of a substrate to carry catalytic active components thereon.

The first carrying method is to prepare hydroxide (such as aluminium isopropoxide (Al-isoP)) to be matured into an oxide for forming a substrate, and the prepared hydroxide "c" (Al-isoP) is added into the emulsion solution. Then, noble metal particles 10 and transition metal particles 16 encapsulated within each reverse micelle 17 are clathrated by a substrate 18 (Al-isoP c), thereby forming a catalyst precursor 19 having a surface carrying noble metal particles 10 and transition metal particles 16 thereon. According to the first carrying method, catalytic active components 10, 16 can be relatively uniformly carried not only on an outermost surface of a substrate 18 but also on surfaces of holes formed in the substrate 18. As a result, it becomes possible to avoid sintering of noble metal particles and to restrict deterioration of catalytic activities.

The second carrying method is to prepare a solution including a solvent containing a dispersed powder "d" (such as aluminum oxide ($Al_2O_3$) particles) of an oxide for forming a substrate, and as shown in FIG. 2, the prepared solution is mixed into the emulsion solution so as to cause a surface of substrate 20 to carry thereon noble metal particles 10 and transition metal particles 16, thereby forming a catalyst precursor 21. According to the second carrying method, it becomes possible to cause a substrate to relatively uniformly carry catalytic active components 10, 16 thereon.

The spraying step 3 is a step for spraying the emulsion solution containing catalyst precursors 19 or 21 obtained in the carrying step 2, in an inert gas atmosphere (such as nitrogen atmosphere) so as to eliminate an organic solvent, thereby obtaining a dried catalyst precursor. The reason why the spraying is conducted in an inert gas atmosphere, is that, since catalyst precursors are present within an organic solvent, and the organic solvent will catch fire when the emulsion solution containing catalyst precursors is directly sprayed into an oxidizing atmosphere at a high temperature, thereby causing nonuniformity of firing temperatures of particles of catalytic active components contained in reverse micelles. Occurrence of nonuniformity of firing temperatures causes non-uniform particle growth of catalytic active components, or oxidizes noble metal particles carried on a substrate to form a metal oxide, thereby deteriorating catalytic activities. Thus, in the spraying step 3, the emulsion solution containing catalyst precursors is sprayed within an electric furnace in an inert gas atmosphere (such as nitrogen, helium or argon atmosphere) to thereby eliminate an organic solvent. By going through the spraying step 3, it becomes possible to decrease contact between particles of catalytic active components to restrict particle growth of catalytic active components, thereby avoiding deterioration of catalytic activities, as compared with the conventional producing method for firing after drying.

The firing step 4 is a step for continuously firing dried catalyst precursors obtained in the spraying step 3, in an air atmosphere to thereby obtain a catalyst powder. Particle diameters of the obtained catalyst powder are about 5 nm. The first carrying method and the second carrying method each allow noble metal particles 22 and transition metal particles 23 to be relatively uniformly carried on surfaces of substrates 18 and 20, respectively.

Thus, while alcohol has been conventionally added into an emulsion solution containing catalyst precursors to break reverse micelles and the obtained precipitate is passed through filtering, drying, grinding and firing steps, such steps can be made unnecessary so that producing steps are decreased in number, thereby allowing a shortened producing time and a decreased producing cost.

Materials to be used in the producing steps of the above-mentioned catalyst are explained in the paragraphs that follow.

Examples of the substrate include one or more kinds of porous oxides selected from alumina ($Al_2O_3$), zirconia ($ZrO_2$), magnesia (MgO), silica ($SiO_2$), $CeO_2$, $TiO_2$, silica alumina, vanadium oxide, and tungsten oxide.

The noble metal element is at least one element selected from Ru, Rh, Pd, Ag, Ir, Pt, and Au exemplifying kinds of selectable noble metals, and it is possible to select an optimum element among the mentioned noble metals depending on usage, kind, and other considerations of the catalyst. Further, the noble metal to be selected is not limited to one kind, and it is possible to use reverse micellar solution such that Pt salt and Rh salt are mixed into reverse micelles, for example, thereby enabling production of a catalyst which carries complex fine particles of Pt—Rh and complex fine particles with a metal oxide, on a surface of a substrate to be formed of the metal oxide. Among the mentioned noble metals, it is particularly preferable to select Pt, Pd, Rh, and the like having higher catalytic activities.

Usable as the noble metal salt are dinitro-diammine Pt (II) nitric acid-acidic aqueous solution, hexachloro Pt(IV) acidic solution, hexaamine Pt(IV) tetrachloride solution, palladium chloride aqueous solution, palladium nitrate aqueous solution, dinitro-diammine palladium dichloride solution, rhodium chloride solution, rhodium nitrate solution, ruthenium chloride solution, ruthenium nitrate solution, and hexachloro iridic acid aqueous solution, for example.

Note that although the surface area of noble metal is increased to enhance the catalytic activity when the catalytic active component is prepared from the noble metal only, this leads to an increased cost and occurrence of sintering accompanying to an increased amount of the contained noble metal. Thus, transition metal element(s) or rare earth element(s) shown hereinafter and acting as co-catalyst(s) is/are added, thereby restricting sintering of the noble metal and to obtain a catalyst having a higher catalytic activity by virtue of interactions such as electron transfer even when the usage amount of noble metal is decreased. Particularly, when the noble metal coexists, on the substrate, with a transition metal compound which has a lower catalytic activity in itself, parts of transition metal elements are susceptible to take a reduced state. Thus, hydrogen within exhaust gas can reach up to the transition metal compound through the catalytic noble metal (spillover) under a so-called stoichiometric condition where an oxygen amount and a reductant amount are identical in ratio, for example, thereby resulting in a reducing state where activity of a catalyst for purifying exhaust gas is readily obtained. Thus, the catalyst exhibits an activity in an environment where a reducing atmosphere is provided.

Preferably usable as the transition metal element is at least one kind of metal selected from Mn, Fe, Co, Ni, Cu, Zr, Ti, W, and Zn. It is more preferable to select Mn, Fe, Co, Ni, Cu, Zn in row 4, and it is desirable to select an optimum metal among the mentioned ones depending on usage, kind, and other considerations of the catalyst. Further, the transition metal element is not limited to one kind, and it is possible to adopt reverse micellar solution containing Co salt and Cu salt in a mixed manner, thereby enabling production of a catalyst including a metal oxide having a surface carrying thereon noble metal as well as complex fine particles with Co oxide and Cu oxide.

It is preferable to use element(s) of the group IIIA as rare earth element(s), and particularly La or Ce.

It is difficult for these metals to dissolve in a metal oxide as a substrate into a state of solid solution, thereby desirably acting as a co-catalyst for enhancing a catalytic activity of the noble metal per unit mass.

Usable as the organic solvent are cyclohexane, methylcyclohexane, cycloheptane, heptanol, octanol, dodecyl alcohol, cetyl alcohol, isooctane, n-heptane, n-hexane, n-decane, benzene, toluene, xylene, etc. Further, it is possible to use two or more kinds of mixed solutions, and to exemplarily use and prepare different kinds of organic solvents for reverse micelles containing the noble metal and for reverse micelles containing the metal as the co-catalyst, respectively.

Usable as the surfactant are polyoxyethylene nonylphenyl ether, magnesium laurate, zinc caprate, zinc myristate, sodium phenyl stearate, aluminum dicaprylate, tetra-isoamyl ammonium thiocyanate, n-octadecyl tri-n-butyl ammonium formate, n-amyl tri-n-butyl ammonium iodide, sodium bis(2-ethylhexyl) succinate, sodium dinonyl naphthalene sulfonate, calcium cetyl sulfate, dodecyl amine oleate, dodecyl amine propionate, cetyltrimethylammonium bromide, stearyl trimethylammonium bromide, cetyltrimethylammonium chloride, stearyl trimethylammonium chloride, dodecyl trimethylammoniumbromide, octadecyl trimethylammoniumbromide, dodecyl trimethylammonium chloride, octadecyl trimethylammonium chloride, di-dodecyl dimethylammonium bromide, di-tetradecyl dimethylammonium bromide, di-dodecyl ditrimethylammonium chloride, di-tetradecyl dimethylammonium chloride, (2-octyloxy-1-octyloxymethyl) polyoxyethylene ethyl ether, etc. Further, it is possible to use two or more kinds of mixed solutions, and to adopt different kinds of surfactants for reverse micelles containing the noble metal and for reverse micelles containing the metal, respectively.

Usable as the reducing agent are hydrazine ($N_2H_4$), sodium hydroborate ($NaBH_4$), sodium thiosulfate, citric acid, sodium citrate, L-ascorbic acid, formic acid, formaldehyde, methanol, ethanol, ethylene, vitamin B, etc. It is possible to use two or more kinds of these reducing agents.

Usable as the precipitating agent are those with which hydroxides of the noble metal and the transition metal are obtainable, such as ammonia water and tetramethylammonium hydroxide.

Explanation will be made based on Examples. Note that substrates and catalytic active components (noble metal, transition metal, and rare earth) are not limited to those materials to be mentioned in the Examples.

Example 1

In Example 1, a catalyst powder was created by using co-reduction based on aluminium isopropoxide (Al-isoP) clathration. This will be described with reference to FIG. 3.

Figure 3:
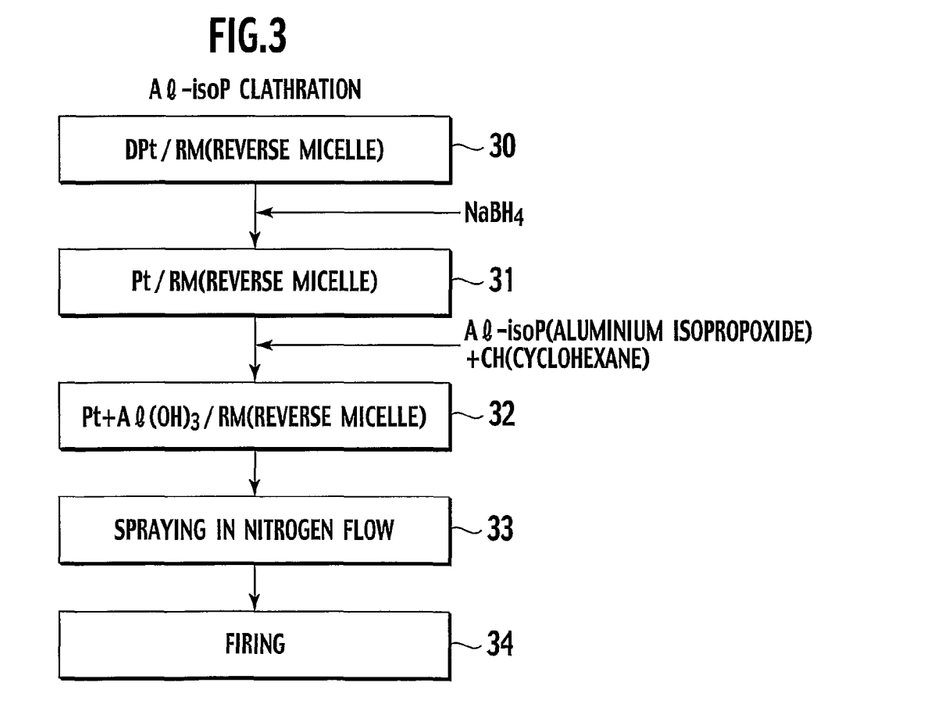
FIG. 3 is a process chart of procedures for producing a catalyst powder by utilizing co-reduction based on aluminium isopropoxide (Al-isoP) clathration in Example 1.

Polyethylene glycol-mono-4-nonylphenyl ether was mixed into cyclohexane in a manner to achieve a molar ratio of 0.15, and added thereto was a dinitro-diamine platinum aqueous solution (Pt concentration: 8.46 wt %) to finally attain a 0.5 wt % of substrate, followed by stirring for 2 hours (step 30). Added to this solution was sodium borohydride (NaBH$_4$) until the color of the solution changed black, followed by stirring for 2 hours to subsequently prepare reverse micellar solution A (step 31).

Water was added to the reverse micellar solution A to achieve a value of RW=20 for a molar ratio of water encapsulated in each reverse micelle relative to surfactant, followed by stirring for 2 hours.

Mixed into the reverse micellar solution A was a solution obtained by mixing Al isopropoxide into cyclohexane and by stirring for 1 hour, followed by stirring for 2 hours to prepare a catalyst precursor carrying platinum (step 32).

The obtained catalyst precursor was sprayed into a kiln at 400° C. in nitrogen flow (step 33), thereby obtaining a solid matter which was then taken out, followed by firing for 1 hour at 600° C. in air atmosphere (step 34).

Example 2

In Example 2, a catalyst powder was created by using a method of impregnation into Al$_2$O$_3$.

Polyethylene glycol-mono-4-nonylphenyl ether was mixed into cyclohexane in a manner to achieve a molar ratio of 0.15, and added thereto was a dinitro-diamine platinum aqueous solution (Pt concentration: 8.46 wt %) to finally attain a 0.5 wt % of substrate, followed by stirring for 2 hours. Added to this solution was sodium borohydride until the color of the solution was changed into black, followed by stirring for 2 hours to subsequently prepare reverse micellar solution A.

Water was added to the prepared emulsion solution A to achieve a value of RW=20 for a molar ratio of encapsulated water relative to surfactant, followed by stirring for 2 hours.

The emulsion solution A was mixed into a solution obtained by mixing Al$_2$O$_3$ particles having an averaged particle diameter of 50 nm into cyclohexane and by stirring for 1 hour, followed by stirring for 2 hours to prepare a catalyst precursor carrying platinum.

The obtained catalyst precursor was used, and sprayed and fired identically to Example 1.

Example 3

In Example 3, a catalyst powder was created by using co-reduction based on aluminium isopropoxide (Al-isoP) clathration and by mixing transition metal element Co.

Polyethylene glycol-mono-4-nonylphenyl ether was mixed into cyclohexane in a manner to achieve a molar ratio of 0.15, and added thereto was a dinitro-diamine platinum aqueous solution (Pt concentration: 8.46 wt %) to finally attain a 0.5 wt % of substrate, followed by stirring for 2 hours. Added to this solution was sodium borohydride until the color of the solution changed black, followed by stirring for 2 hours to subsequently prepare reverse micellar solution A.

Polyethylene glycol-mono-4-nonylphenyl ether was mixed into cyclohexane in a manner to achieve a molar ratio of 0.15, and added thereto was a cobalt aqueous solution obtained by dissolving cobalt nitrate in distilled water to finally attain a 0.5 wt % of substrate, followed by stirring. Added to this solution was hydrazine as a reducing agent until the color of the solution was changed, followed by stirring for 2 hours to subsequently prepare reverse micellar solution B.

The reverse micellar solution A and the reverse micellar solution B were mixed to each other, and then water was added to the mixed solution to achieve a value of RW=20 for a molar ratio of encapsulated water relative to surfactant, followed by stirring for 2 hours.

The mixed solution of the emulsion solution A and the emulsion solution B was mixed into a solution obtained by mixing Al isopropoxide into cyclohexane and by stirring for 1 hour, followed by stirring for 2 hours to prepare a catalyst precursor including a substrate carrying platinum and cobalt.

The obtained catalyst precursor was used, and sprayed and fired identically to Example 1.

Example 4

In Example 4, a catalyst powder was created by using a method of impregnation into Al$_2$O$_3$.

Polyethylene glycol-mono-4-nonylphenyl ether was mixed into cyclohexane in a manner to achieve a molar ratio of 0.15, and added thereto was a dinitro-diamine platinum aqueous solution (Pt concentration: 8.46 wt %) to finally attain a 0.5 wt % of substrate, followed by stirring for 2 hours. Added to this solution was sodium borohydride until the color of the solution changed black, followed by stirring for 2 hours to subsequently prepare reverse micellar solution A.

Polyethylene glycol-mono-4-nonylphenyl ether was mixed into cyclohexane in a manner to achieve a molar ratio of 0.15, and added thereto was a cobalt aqueous solution obtained by dissolving cobalt nitrate in distilled water to finally attain a 0.5 wt % of substrate, followed by stirring. Added to this solution was hydrazine as a reducing agent until the color of the solution was changed, followed by stirring for 2 hours to subsequently prepare reverse micellar solution B.

The prepared emulsion solution A and emulsion solution B were mixed to each other, and then water was added to the mixed solution to achieve a value of RW=20 for a molar ratio of encapsulated water relative to surfactant, followed by stirring for 2 hours.

The mixed solution of the emulsion solution A and emulsion solution B was mixed into a solution obtained by mixing Al$_2$O$_3$ particles having an averaged particle diameter of 50 nm into cyclohexane and by stirring for 1 hour, followed by stirring for 2 hours to prepare a catalyst precursor carrying platinum and cobalt.

The obtained catalyst precursor was used, and sprayed and fired identically to Example 1.

Example 5

In Example 5, a catalyst powder identically to Example 3, was created by using co-reduction based on aluminium isopropoxide (Al-isoP) clathration. It was the same as Example 3, except that iron nitrate, instead of cobalt, was added into the emulsion solution B presented in Example 3 in a manner that the weight ratio of iron eventually became 5 wt % of a substrate.

Example 6

In Example 6, a catalyst powder identically to Example 3 created was by using co-reduction based on aluminium isopropoxide (Al-isoP) clathration. It was the same as Example 3, except that rhodium nitrate, instead of dinitro-diamine platinum, was added into the emulsion solution a presented in Example 3.

Example 7

In Example 7, a catalyst powder identically to Example 3 created was by using co-reduction based on aluminium isopropoxide (Al-isoP) clathration. It was the same as Example 3, except that palladium nitrate, instead of dinitro-diamine platinum, was added into the reverse micellar solution A presented in Example 3.

Example 8

In Example 8, a catalyst powder was created by using co-reduction based on aluminium isopropoxide (Al-isoP) clathration.

Polyethylene glycol-mono-4-nonylphenyl ether was mixed into cyclohexane in a manner to achieve a molar ratio of 0.15, and added thereto was a dinitro-diamine platinum aqueous solution (Pt concentration: 8.46 wt %) to finally attain a 0.5 wt % of substrate, followed by stirring for 2 hours. Added to this solution was sodium borohydride until the color of the solution changed black, followed by stirring for 2 hours to subsequently prepare reverse micellar solution A.

Polyethylene glycol-mono-4-nonylphenyl ether was mixed into cyclohexane in a manner to achieve a molar ratio of 0.15, and added thereto was a cobalt aqueous solution obtained by dissolving cobalt nitrate in distilled water to finally attain a 0.5 wt % of substrate, followed by stirring. Added to this solution was hydrazine until the color of the solution was changed, followed by stirring for 2 hours to subsequently prepare reverse micellar solution B.

Polyethylene glycol-mono-4-nonylphenyl ether was mixed into cyclohexane in a manner to achieve a molar ratio of 0.15, and added thereto was a cerium aqueous solution obtained by dissolving cerium nitrate in distilled water to finally attain a 10 wt % of substrate, followed by stirring to thereby prepare reverse micellar solution C.

The emulsion solution A and emulsion solution B were mixed into each other, and further the emulsion solution C was mixed thereinto, followed by addition of ammonia into the mixed solution until hydroxide was formed by cerium.

Water was added to the obtained solution to achieve a value of RW=20 for a molar ratio of encapsulated water relative to surfactant, followed by stirring for 2 hours.

The mixed solution of the reverse micellar solution A, B, C was mixed into a solution obtained by mixing aluminium isopropoxide into cyclohexane and by stirring for 1 hour, followed by stirring for 2 hours to prepare a catalyst precursor carrying platinum, cobalt, and cerium.

The obtained catalyst precursor was used, and sprayed and fired identically to Example 1.

Example 9

In Example 9, a catalyst powder was created by using a method of impregnation into $Al_2O_3$.

Polyethylene glycol-mono-4-nonylphenyl ether was mixed into cyclohexane in a manner to achieve a molar ratio of 0.15, and added thereto was a dinitro-diamine platinum aqueous solution (Pt concentration: 8.46 wt %) to finally attain a 0.5 wt % of substrate, followed by stirring for 2 hours. Added to this solution was sodium borohydride until the color of the solution was changed kite black, followed by stirring for 2 hours to subsequently prepare reverse micellar solution A.

Polyethylene glycol-mono-4-nonylphenyl ether was mixed into cyclohexane in a manner to achieve a molar ratio of 0.15, and added thereto was a cobalt aqueous solution obtained by dissolving cobalt nitrate in distilled water to finally attain a 0.5 wt % of substrate, followed by stirring. Added to this solution was hydrazine until the color of the solution was changed, followed by stirring for 2 hours to subsequently prepare reverse micellar solution B.

Polyethylene glycol-mono-4-nonylphenyl ether was mixed into cyclohexane in a manner to achieve a molar ratio of 0.15, and added thereto was a lanthanum aqueous solution obtained by dissolving lanthanum nitrate in distilled water to finally attain a 10 wt % of substrate, followed by stirring to thereby prepare reverse micellar solution C.

The prepared emulsion solution A and emulsion solution B were mixed into each other, and further the emulsion solution C was mixed thereinto, followed by addition of ammonia as a precipitating agent into the mixed solution until hydroxide was formed by lanthanum.

Water was added to the obtained solution to achieve a value of RW=20 for a molar ratio of encapsulated water relative to surfactant, followed by stirring for 2 hours.

The mixed solution of the emulsion solutions A, B, C was mixed into a solution obtained by mixing $Al_2O_3$ particles having an averaged particle diameter of 50 nm into cyclohexane and by stirring for 1 hour, followed by stirring for 2 hours to prepare a catalyst precursor carrying platinum, cobalt, and lanthanum. The obtained catalyst precursor was used, and sprayed and fired identically to Example 1.

Comparative Example 1

In Comparative Example 1, a catalyst precursor was prepared by using co-reduction based on aluminium isopropoxide (Al-isoP) clathration presented in Example 1. It was the same as Example 1, except that water was added to the prepared emulsion solution A to achieve a value of RW=5 for a molar ratio of encapsulated water relative to surfactant.

Added into the emulsion solution containing the obtained catalyst precursor was methanol which was $\frac{1}{10}$ of the solvent, thereby breaking reverse micelles to subsequently precipitate the catalyst precursor. The precipitate was separated from the solvent by using a suction filtration device, and washed by ethanol. The obtained solid matter was dried at 150° C. overnight, followed by grinding and by firing thereafter in airflow at 600° C. for 1 hour.

Comparative Example 2

In Comparative Example 2, a catalyst powder was created by the same procedure as Comparative Example 1. The point different from Comparative Example 1 was that, water was mixed into the reverse micellar solution A to achieve a value of RW=10 for a molar ratio of encapsulated water relative to surfactant.

Comparative Example 3

In Comparative Example 3, a catalyst powder was created by the same procedure as Comparative Example 1. The point different from Comparative Example 1 was that, water was mixed into the emulsion solution A containing reverse micelles formed therein to achieve a value of RW=20 for a molar ratio of encapsulated water relative to surfactant.

Comparative Example 4

In Comparative Example 4, a catalyst precursor was prepared by using the procedure for impregnation into $Al_2O_3$ presented in Example 2. The same procedure as Comparative Example 1 was conducted by using an emulsion solution containing the prepared catalyst precursor, thereby obtaining a catalyst powder.

Comparative Example 5

In Comparative Example 5, a catalyst precursor was prepared by using co-reduction based on aluminium isopropoxide (Al-isoP) clathration presented in Example 3. The same procedure as Comparative Example 1 was conducted by using an emulsion solution containing the prepared catalyst precursor, thereby obtaining a catalyst powder.

Comparative Example 6

In Comparative Example 6, a catalyst precursor was prepared by using the procedure for impregnation into $Al_2O_3$ presented in Example 4. The same procedure as Comparative Example 1 was conducted by using an emulsion solution containing the prepared catalyst precursor, thereby obtaining a catalyst powder.

Comparative Example 7

In Comparative Example 7, a catalyst precursor was prepared by using co-reduction based on aluminium isopropoxide (Al-isoP) clathration presented in Example 8. The same procedure as Comparative Example 1 was conducted by using an emulsion solution containing the prepared catalyst precursor, thereby obtaining a catalyst powder.

Used and coated onto a honeycomb carrier was 500 g of each of catalyst powders of Examples 1 through 9 and Comparative Example 1 through Comparative Example 3 obtained from the above producing methods. Thereafter, each catalyst was used to purify exhaust gas, by using a V-type 6-cylinder engine manufactured by Nissan Motor Co., Ltd., and lead-free gasoline as fuel, while setting an inlet temperature of the catalyst at 700° C. and operating the engine for 50 hours. Thereafter, the catalyst was scraped down from the catalyst layer of the catalyst after a durability test, and the scraped catalyst powder was embedded into an epoxy resin, followed by curing and preparation of an ultra-thin slice by an ultra-mecrotome. For the prepared ultra-thin slice, observation was conducted by using a transmission electron microscope (FE-TEM-EDX: HF-2000 apparatus (manufactured by Hitachi, Ltd.)) at an acceleration voltage of 200 kV and a cutting condition of ordinary temperature. Contrasted (shadow) parts in the image obtained by the transmission electron microscope were focused to specify metal kinds and to measure particle diameters of specified metals, thereby measuring averaged particle diameters of respective metal particles. Measurement results are shown in Table 1.

TABLE 1

| | Raw material | | | Noble metal ele. | | Tran. metal ele. | | Rare earth ele. | |
| | of substrate ($Al_2O_3$) | Preparing steps | RW | Kind | Aver. parti. diam. [nm] | Kind | Aver. parti. diam. [nm] | Kind | Aver. parti. diam. [nm] |
|---|---|---|---|---|---|---|---|---|---|
| Ex. 1 | Al isoprop. | Prepa. of cat. precur.→Spraying in nitrogen→Firing in air | 20 | Pt | 1.8 | — | — | — | — |
| Ex. 2 | $Al_2O_3$ | Prepa. of cat. precur.→Spraying in nitrogen→Firing in air | 20 | Pt | 2.1 | — | — | — | — |
| Ex. 3 | Al isoprop. | Prepa. of cat. precur.→Spraying in nitrogen→Firing in air | 20 | Pt | 2.0 | Co | 15 | — | — |
| Ex. 4 | $Al_2O_3$ | Prepa. of cat. precur.→Spraying in nitrogen→Firing in air | 20 | Pt | 3.3 | Co | 17 | — | — |
| Ex. 5 | Al isoprop. | Prepa. of cat. precur.→Spraying in nitrogen→Firing in air | 20 | Pt | 2.5 | Fe | 9 | — | — |
| Ex. 6 | Al isoprop. | Prepa. of cat. precur.→Spraying in nitrogen→Firing in air | 20 | Rh | 1.8 | Co | 25 | — | — |
| Ex. 7 | Al isoprop. | Prepa. of cat. precur.→Spraying in nitrogen→Firing in air | 20 | Pd | 1.5 | Co | 23 | — | — |
| Ex. 8 | Al isoprop. | Prepa. of cat. precur.→Spraying in nitrogen→Firing in air | 20 | Pt | 1.9 | Co | 16 | Ce | 47 |
| Ex. 9 | $Al_2O_3$ | Prepa. of cat. precur.→Spraying in nitrogen→Firing in air | 20 | Pt | 2.1 | Co | 18 | Ce | 59 |
| Com. Ex. 1 | Al isoprop. | Catalyst precursor preparation→Micelle breaking→Filtering→Drying→Grinding→Firing in air | 5 | Pt | 2.2 | — | — | — | — |
| Com. Ex. 2 | Al isoprop. | Catalyst precursor preparation→Micelle breaking→Filtering→Drying→Grinding→Firing in air | 10 | Pt | 2.8 | — | — | — | — |
| Com. Ex. 3 | Al isoprop. | Catalyst precursor preparation→Micelle breaking→Filtering→Drying→Grinding→Firing in air | 20 | Pt | 2.9 | — | — | — | — |
| Com. Ex. 4 | $Al_2O_3$ | Catalyst precursor preparation→Micelle breaking→Filtering→Drying→Grinding→Firing in air | 20 | Pt | 3.1 | — | — | — | — |

TABLE 1-continued

| | Raw material | | | Noble metal ele. | | Tran. metal ele. | | Rare earth ele. | |
| | of substrate (Al$_2$O$_3$) | Preparing steps | RW | Kind | Aver. parti. diam. [nm] | Kind | Aver. parti. diam. [nm] | Kind | Aver. parti. diam. [nm] |
|---|---|---|---|---|---|---|---|---|---|
| Com. Ex. 5 | Al isoprop. | Catalyst precursor preparation→ Micelle breaking→Filtering→ Drying→Grinding→Firing in air | 20 | Pt | 2.4 | Co | 20 | — | — |
| Com. Ex. 6 | Al$_2$O$_3$ | Catalyst precursor preparation→ Micelle breaking→Filtering→ Drying→Grinding→Firing in air | 20 | Pt | 5.0 | Co | 17 | — | — |
| Com. Ex. 7 | Al isoprop. | Catalyst precursor preparation→ Micelle breaking→Filtering→ Drying→Grinding→Firing in air | 20 | Pt | 2.2 | Co | 20 | Ce | 62 |

As shown in Table 1, although each of catalysts of Comparative Example 1 through Comparative Example 7 had an averaged particle diameter of 5.0 nm or less for noble metal particles, the number of steps was numerous so that various steps were required such as preparing a catalyst precursor, breaking reverse micelles, thereafter filtering, drying, grinding, and firing in air. Contrary, in each of catalysts of Example 1 through Example 9, it was possible to achieve an averaged particle diameter of 5.0 nm or less for noble metal particles, even when adopting the simplified steps of preparing a catalyst precursor, thereafter spraying it in an inert gas atmosphere, and then firing it. As a result, it was found that catalysts having higher activities are obtained by bringing noble metal particles into fine particles to thereby widen surface areas according to the catalysts of Example 1 through Example 9.

INDUSTRIAL APPLICABILITY

According to the present invention, there is provided a catalyst producing method which makes it possible not only to decrease the number of producing steps to thereby shorten a producing time and decrease a producing cost but also to obtain uniform noble metal fine particles, thereby enabling obtainment of a catalyst having a higher activity.

According to the present invention, there is further provided a catalyst having an enhanced activity with a lower cost.

The invention claimed is:

1. A catalyst producing method comprising:
   preparing a first reverse micellar solution including an aqueous solution containing a first precursor of a noble metal element as a catalytic active component;
   reducing the noble metal precursor to a noble metal particle by adding a first reducing agent to the first reverse micellar solution;
   preparing a second reverse micellar solution including an aqueous solution containing a second precursor of a transition metal element as the catalytic active component;
   reducing the transition metal precursor to a transition metal particle by adding a second reducing agent to the second reverse micellar solution;
   mixing the first reverse micellar solution containing the noble metal particle and the second reverse micellar solution containing the transition metal particle to obtain a reverse micelle containing the noble metal particle and the transition metal particle;
   carrying the noble metal particle and the transition metal particle on a substrate to form a catalyst precursor; and
   spraying an emulsion solution containing the catalyst precursor in an inert gas atmosphere to obtain a dried catalyst precursor; and firing the obtained dried catalyst precursor in an air atmosphere.

2. The catalyst producing method as claimed in claim 1, wherein a molar ratio (RW) of water encapsulated in the reverse micelle relative to a surfactant forming the reverse micelle is 20 or less.

3. The catalyst producing method as claimed in claim 1, wherein the catalytic active component further includes a rare earth element.

4. The catalyst producing method as claimed in claim 1, wherein the carrying comprises:
   preparing a solution including a solvent and powder of oxide forming the substrate; and
   mixing the prepared solution and the reverse micellar solution containing the noble metal particle and the transition metal particle to carry the noble metal particle and the transition metal particle on the substrate to thereby form the catalyst precursor.

5. The catalyst producing method as claimed in claim 1, wherein the carrying comprises:
   preparing a hydroxide to be matured into an oxide forming the substrate; and
   clathrating the noble metal particle and the transition metal particle contained in the reverse micelle by the prepared hydroxide to carry the noble metal particle and the transition metal particle on the substrate to thereby form the catalyst precursor.

6. The catalyst producing method as claimed in claim 1, wherein the noble metal element comprises at least one selected from the group consisting of Ru, Rh, Pd, Ag, Ir, Pt and Au.

7. The catalyst producing method as claimed in claim 1, wherein the transition metal element comprises at least one selected from the group consisting of Mn, Fe, Co, Ni, Cu, and Zn.

8. The catalyst producing method as claimed in claim 3, wherein the rare earth element comprises at least one of La and Ce.

* * * * *